United States Patent [19]

Masznyik

[11] Patent Number: 4,723,873
[45] Date of Patent: Feb. 9, 1988

[54] METHOD AND DEVICE FOR PREPARING AN EXISTING BURIED CONDUIT FOR REPLACEMENT BY A NEW CONDUIT

[75] Inventor: Laszlo Masznyik, Dorsten, Fed. Rep. of Germany

[73] Assignee: Ruhrgas Aktiengesellschaft, Essen, Fed. Rep. of Germany

[21] Appl. No.: 888,859

[22] Filed: Jul. 23, 1986

[30] Foreign Application Priority Data

Jul. 23, 1985 [DE] Fed. Rep. of Germany ....... 3526193

[51] Int. Cl.[4] .......................... F16L 1/02; F16L 55/18; B26F 3/00; F25D 17/02
[52] U.S. Cl. .................................... 405/156; 405/154; 405/184; 62/64; 62/320; 62/373; 138/97; 225/93.5; 225/103
[58] Field of Search ............... 405/130, 154, 156, 157, 405/173, 184; 138/97; 225/93.5, 1, 103; 83/15, 170; 62/64, 298, 320, 373

[56] References Cited

U.S. PATENT DOCUMENTS

| | | | |
|---|---|---|---|
| 2,956,717 | 10/1960 | Scharf | 225/1 |
| 3,878,978 | 4/1975 | Martinek | 225/93.5 X |
| 3,979,981 | 9/1976 | Lightstone et al. | 83/170 X |
| 4,110,092 | 8/1978 | Kunioka et al. | 62/64 |
| 4,487,643 | 12/1984 | Ellett | 225/93.5 X |
| 4,505,302 | 3/1985 | Streatfield et al. | 405/184 X |

FOREIGN PATENT DOCUMENTS

| | | | |
|---|---|---|---|
| 1420049 | 1/1976 | United Kingdom | 405/173 |
| 2123111 | 1/1984 | United Kingdom | 405/154 |

*Primary Examiner*—Nancy J. Stodola
*Attorney, Agent, or Firm*—Becker & Becker, Inc.

[57] ABSTRACT

To prepare an existing buried main made from a material which is tough at ambient temperature for replacement by a new main of the same or a larger size via a mole device by fracturing the existing main by compressive and impact forces and by widening the bore for the insertion of the new main that is clamped to the mole device, a liquefied gas having as low a boiling point as possible at atmospheric pressure is sprayed against the conduit wall from a cooling carriage that is pulled through the existing main prior to the movement of the mole device therethrough, thereby cooling the existing main to a temperature causing low-temperature embrittlement of the material of the existing main.

19 Claims, 1 Drawing Figure

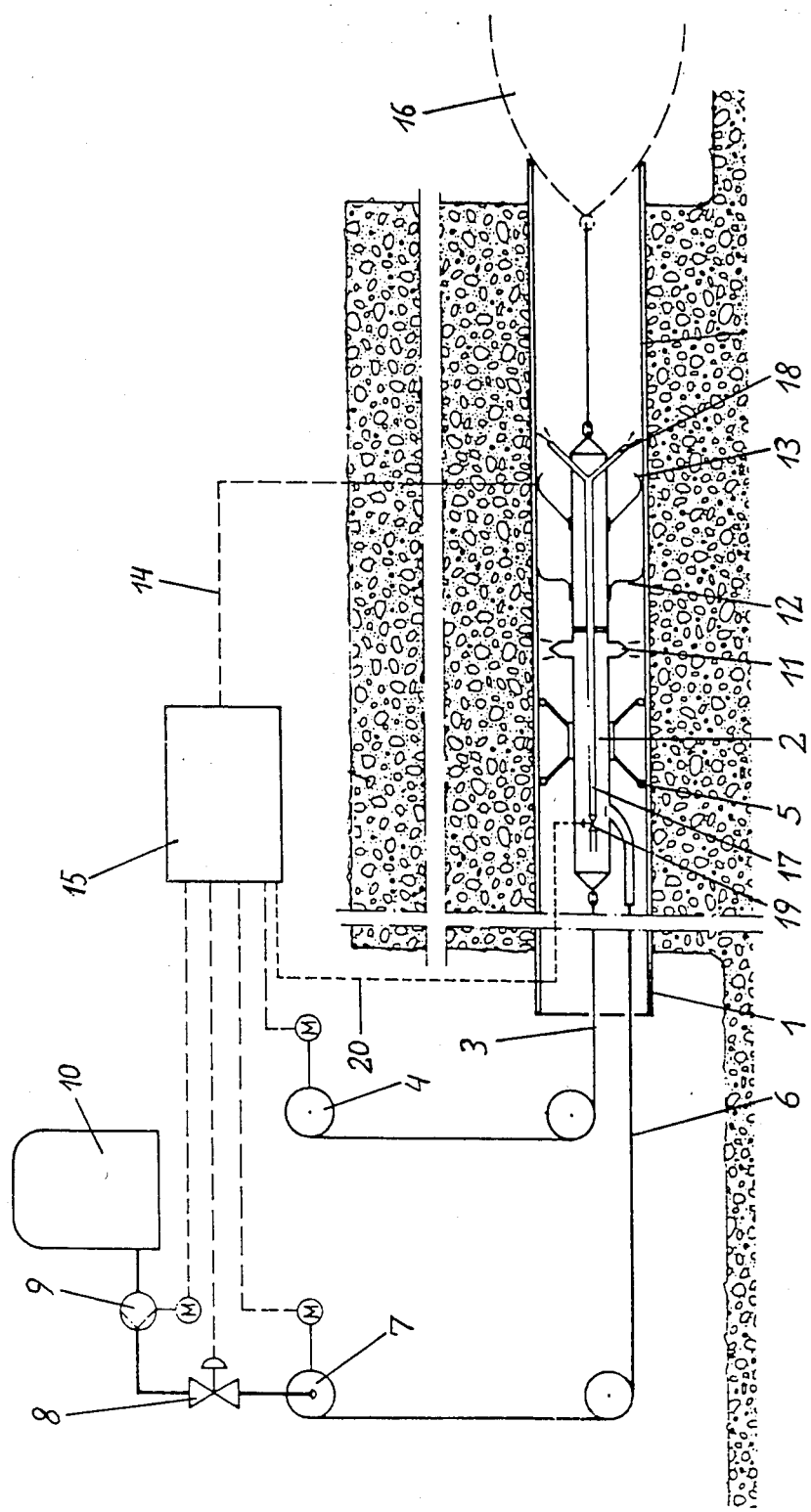

METHOD AND DEVICE FOR PREPARING AN EXISTING BURIED CONDUIT FOR REPLACEMENT BY A NEW CONDUIT

BACKGROUND OF THE INVENTION

1. Field of the Invention

The present invention relates to a method of and a device for preparing an existing underground or buried main or conduit for replacement by a new main by means of a mole device that is moved through the existing main, with the new main clamped or otherwise secured to the mole device. The mole device fractures the existing main from within by compressive and impact forces, and widens the bore thereby created for the insertion of the new main.

2. Description of the Prior Art

U.S. Pat. No. 4,505,302 Streatfield et al dated Mar. 19, 1985 discloses a method of replacing an existing buried main, without excavation, with a new main having a diameter which is equal to or greater than the external diameter of the existing main. According to this method, the existing main is fractured from within by a mole device that is moved through the existing main, with sufficient clearance being provided through the fractured main for movement therethrough of a new main that is clamped to the mole device. According to this U.S. patent, the method is suitable for and applicable to cast iron mains sufficiently brittle, as is generally known, for fracturing by a hammer blow or the like. In other applications, though, buried mains of a tough or ductile material such as steel or plastic must be replaced by new mains of the same or a larger diameter which cannot therefore be inserted into the existing main. The method proposed by said U.S. patent has been unsuitable for mains consisting of pipes of such material.

SUMMARY OF THE INVENTION

An object of the present invention is to provide a method that makes it possible to apply the method disclosed by the U.S. Pat. No. 4,505,302 to mains consisting of pipes not made of brittle cast iron but rather is made of a relatively tough and ductile material which is relatively insensitive to impacts.

According to the method of the present invention, a cooling carriage is moved through the existing main prior to the movement of a mole device therethrough, with liquefied gas that has as low a boiling temperature at atmospheric pressure as possible being sprayed from the cooling carriage against the conduit wall to thereby reduce the temperature of the conduit wall of the existing main to a temperature at which low-temperature embrittlement occurs. The inventive treatment of the existing main, which is preferably undertaken with liquid nitrogen, makes even material which is tough at ambient temperature sufficiently brittle for fracturing by compression and impact by a mole device that is moved through the thus treated existing main, whereupon the fractured main is widened for the insertion of a new main having a diameter equal to or greater than the diameter of the existing main.

The device proposed by the present invention for the application of the inventive method essentially comprises a cooling carriage that is movable through the existing main ahead of the mole device, said cooling carriage being connected by a supply line, inserted in the existing main, with a tank containing liquid nitrogen or a similar liquefied gas that has as low a boiling point as possible at atmospheric pressure; the cooling carriage is furthermore provided with substantially radially arranged spray nozzles for spraying the liquefied gas against the conduit wall around the entire circumference thereof.

The mole device may be coupled with the cooling carriage, which may be pulled by a rope, cable, or similar means through the existing main and may be connected with the liquefied gas tank by a hose that runs substantially parallel to the cable.

Further specific features of the present invention will be described in detail subsequently.

BRIEF DESCRIPTION OF THE DRAWING

The present invention will now be described with the aid of a preferred embodiment in conjunction with the accompanying drawing, which schematically illustrates one exemplary embodiment of a device for carrying out the inventive method.

DETAILED DESCRIPTION OF THE INVENTION

Referring now to the drawing in detail, a buried or underground main or conduit 1 that is to be replaced by a new main is excavated at two points located at some distance from each other; the old main is cut at these two points. A cooling sledge or carriage 2 is inserted into the existing main 1 through the open pipe end shown on the right-hand side of the drawing. The cooling carriage 2 is pulled through the existing main 1 to the left-hand open pipe end by means of a rope or cable 3 and a winch 4. The cooling carriage 2 is provided with guiding means 5 that roll or slide along the wall of the existing main 1 and that support the cooling carriage 2 in such a way that there is adequate uniform radial clearance between the wall and the cooling carriage 2. The cooling carriage 2 is hollow and tubular shaped, and is connected with a hose 6 that may be reeled on the winch 7. The hose 6 connects the cooling carriage 2 via a flow control valve 8 and a pump 9 with a liquid nitrogen tank 10. The cooling carriage 2 is also provided with essentially radially arranged spray nozzles 11 that are distributed around the circumference of the cooling carriage 2. The spray nozzles 11 are expediently located behind the guiding means 5 when viewed in the direction of travel of the cooling carriage 2. The spray nozzles 11 spray liquid nitrogen which is pumped to said cooling carriage 2 through the hose 6, against the wall of the existing main 1 as the cooling carriage 2 is being pulled through the main 1. Behind the spray nozzles 11, when viewed in the direction of travel of the cooling carriage 2, the latter is provided with a shield 12, engages the conduit wall in a seal-like manner, and slides along the conduit wall. Behind the shield 12, when viewed in the direction of travel of the cooling carriage 2, the latter is provided with preferably several temperature sensors 13 that slide along the wall of the existing main 1. The shield 12 prevents the cold vapor of the liquid nitrogen, that is sprayed through the spray nozzles 11 and is evaporated on the conduit wall, from being detected by the temperature sensors 13, since the vapor is discharged from the existing main 1 in the direction of travel of the cooling carriage 2. The temperature sensors 13 are connected with a control device 15 by means of a line 14 which is shown in a simplified form in the drawing. The control line 14 may be coupled with the hose 6, and may be reeled onto the winch 7. As a function of the conduit wall temperature measured by the temperature sensors 13, the control device 15 controls the winch 4 to adjust the speed of travel of the cooling carriage 2, the hose winch 7, as well as the pump 9 and the control valve 8 to adjust liquid nitrogen flow from the tank 10 to the cooling carriage 2.

The treatment or preparation of the existing main 1 which is to be replaced by a new main, by means of liquid nitrogen, which has a boiling point of approximately minus 196° C. at atmospheric pressure, cools the buried existing main 1 sufficiently for low-temperature embrittlement of the pipe material. Such treatment and the ensuing embrittlement enables conduits or pipes to be fractured by impact or compression, even if the pipe material is tough or ductile at ambient temperature as in the case of steel or plastic pipes, and also enables the application to such conduits of the known method of fracturing by compression and by impact, old buried mains from within by moving a mole device therethrough and widening the bore thereby created for the insertion of a new main, of an equal or greater diameter, clamped or otherwise secured to the mole device. The mole device 16 indicated in the drawing may be coupled to the cooling carriage 2.

The liquid nitrogen referred to previously may be replaced by any other suitable liquefied gas provided that the boiling point of such liquefied gas at atmospheric pressure is sufficiently low for cooling the wall of the existing main 1, by evaporation on the wall, to a temperature which is sufficiently low for the low-temperature embrittlement of the conduit material.

In a preferred embodiment of the present invention, additional spray nozzles 18 are arranged on the cooling carriage 2 behind the shield 12 when viewed in the direction of travel of the cooling carriage 2. These additional spray nozzles 18 are connected by line 17 with the inner chamber of the cooling carriage 2, to which liquid nitrogen is supplied through the hose 6. The line 17 is provided with a solenoid valve 19 that is connected with the control device 15 by an electric line 20 in a manner similar to the manner in which the temperature sensors 13 are connected with the control device 15. In the event of a temporary stoppage of the cooling carriage 2, to which the mole device 16 is coupled, the additional spray nozzles 18 may be used to re-cool the once-again heated conduit section between the cooling carriage 2 and the mole device 16 for low-temperature embrittlement and for enabling the continuation of the fracturing operation by the mole device 16.

The present invention is, of course, in no way restricted to the specific disclosure of the specification and drawing, but also encompasses any modifications within the scope of the appended claims.

What I claim is:

1. A method of preparing an existing underground conduit for replacement by a new conduit, said method including the steps of moving a mole device through the existing conduit, fracturing the latter from within with said mole device via compressive and impact forces, and widening the space occupied by said existing conduit to allow for insertion of said new conduit, which is connected behind said mole device, said method further comprising the steps of:
   prior to said step of moving said mole device through said existing conduit, moving a cooling carriage through said existing conduit; and
   spraying liquefied gas from said cooling carriage onto the wall of said existing conduit over the length of the conduit to cool the latter to a temperature that causes lowtemperature embrittlement of the material of said existing conduit, with said liquefied gas having a boiling point that is as low as possible at atmospheric pressure.

2. A method according to claim 1, which includes the step of providing liquid nitrogen as said liquefied gas.

3. A method according to claim 1, which includes the further steps of:
   providing a shield between said cooling carriage and the wall of said existing conduit;
   carrying out said step of spraying liquefied gas ahead of said shield when viewed in the direction of travel of said cooling carriage through said existing conduit;
   withdrawing said liquefied gas from said existing conduit ahead of said shield;
   measuring the temperature of the wall of said existing conduit behind said shield; and
   as a function of such measured temperature that is influenced by cooling carriage speed and quantity of liquefied gas that is to be sprayed in, accordingly controlling at least one of the cooling carriage speed and the quantity of liquefied gas that is to be sprayed in, said controlling thereof occurring so that the measured temperature corresponds to desired conduit wall temperature.

4. A device for preparing an existing underground conduit for replacement by a new conduit, comprising:
   a cooling carriage that is adapted for movement through said existing conduit, with said cooling carriage being connected via a supply line to a tank for receiving therefrom liquefied gas that has a boiling point that is as low as possible at atmospheric pressure;
   spray nozzles provided on said cooling carriage in a substantially radial arrangement for spraying said liquefied gas onto the wall of said existing conduit, from within, over the entire inner periphery of said existing conduit over the length of the conduit; and
   a mole device for movement through said existing conduit, after said cooling carriage, for fracturing said existing conduit from within with compressive and impact forces, and for widening the space occupied by said existing conduit to allow for insertion of said new conduit, which is connected behind said mole device.

5. A device according to claim 4, in which said liquefied gas is liquid nitrogen.

6. A device according to claim 4, in which said cooling carriage is provided with guiding means for movement along the wall of said existing conduit in such a way that said cooling carriage is spaced essentially radially uniformly from said wall of said existing conduit.

7. A device according to claim 4, in which said cooling carriage is provided with a shield that is disposed behind said spray nozzles when viewed in the direction of travel of said cooling carriage through said existing conduit, with said shield sliding along said wall of said existing condut, and resting thereagainst in a sealing manner;
   in which said cooling carriage is further provided, behind said shield, with at least one temperature sensor, which slides along said wall of said existing conduit and which measures temperature of the wall that is influenced by cooling carriage speed and quantity of liquefied gas that is to be supplied; and which includes a control device for control of at least one of the cooling carriage speed and the quantity of liquefied gas that is to be supplied, with said at least one temperature sensor being connected to said control device via a control line, said control device effecting change of at least one of cooling carriage speed and quantity of liquefied gas that is to be supplied corresponding to deviation of the measured temperature of the wall from desired conduit wall temperature.

8. A method of preparing an existing underground conduit for replacement by a new conduit, said method including the steps of moving a mole device through the existing conduit, fracturing the latter from within with said mole device via compressive and impact forces, and widening the space occupied by said existing conduit to allow for insertion of said new conduit, which is connected behind said mole device, said method further comprising the steps of:

prior to said step of moving said mole device through said existing conduit, moving a cooling carriage through said existing conduit;

spraying liquefied gas from said cooling carriage onto the wall of said existing conduit to cool the latter to a temperature that causes low-temperature embrittlement of the material of said existing conduit, with said liquefied gas having a boiling point that is as low as possible at atmospheric pressure;

providing a shield between said cooling carriage and the wall of said existing conduit;

carrying out said step of spraying liquefied gas ahead of said shield when viewed in the direction of travel of said cooling carriage through said existing conduit; and withdrawing said liquefied gas from said existing conduit ahead of said shield.

9. A method according to claim 8, which includes the step of providing liquid nitrogen as said liquefied gas.

10. A method according to claim 8, which includes the further steps of:

measuring the temperature of the wall of said existing conduit behind said shield, and as a function of such measured temperature that is influenced by cooling carriage speed and quantity of liquefied gas that is to be sprayed in, accordingly controlling at least one of the cooling carriage speed and the quantity of liquefied gas that is to be sprayed in, said controlling thereof occurring so that the measured temperature corresponds to desired conduit wall temperature.

11. A method of preparing an existing underground conduit for replacement by a new conduit, said method including the steps of moving a mole device through the existing conduit, fracturing the latter from within with said mole device via compressive and impact forces, and widening the space occupied by said existing conduit to allow for insertion of said new conduit, which is connected behind said mole device, said method further comprising the steps of:

prior to said step of moving said mole device through said existing conduit, moving a cooling carriage through said existing conduit;

spraying liquefied gas from said cooling carriage onto the wall of said existing conduit to cool the latter to a temperature that causes low-temperature embrittlement of the material of said existing conduit, with said liquefied gas having a boiling point that is as low as possible at atmospheric pressure;

providing a shield between said cooling carriage and the wall of said existing conduit;

carrying out said step of spraying liquefied gas ahead of said shield when viewed in the direction of travel of said cooling carriage through said existing conduit;

withdrawing said liquefied gas from said existing conduit ahead of said shield;

measuring the temperature of the wall of said existing conduit behind said shield; and as a function of such measured temperature that is influenced by cooling carriage speed and quantity of liquefied gas that is to be sprayed in, accordingly controlling at least one of the cooling carriage speed and the quantity of liquefied gas that is to be sprayed in, said controlling thereof occurring so that the measured temperature corresponds to desired conduit wall temperature.

12. A method according to claim 11, which includes the step of providing liquid nitrogen as said liquefied gas.

13. A device for preparing an existing underground conduit for replacement by a new conduit, comprising:

a cooling carriage that is adapted for movement through said existing conduit, with said cooling carriage being connected via a supply line to a tank for receiving therefrom liquefied gas that has a boiling point that is as low as possible at atmospheric pressure;

spray nozzles provided on said cooling carriage in a substantially radial arrangement for spraying said liquefied gas onto the wall of said existing conduit, from within, over the entire inner periphery of said existing conduit; and a mole device for movement through said existing conduit, after said cooling carriage, for fracturing said existing conduit from within with compressive and impact forces, and for widening the space occupied by said existing conduit to allow for insertion of said new conduit, which is connected behind said mole device;

said cooling carriage being provided with a shield that is disposed behind said spray nozzles when viewed in the direction of travel of said cooling carriage through said existing conduit, with said shield sliding along said wall of said existing conduit, and resting thereagainst in a sealing manner.

14. A device according to claim 13, in which said liquefied gas is liquid nitrogen.

15. A device according to claim 13, in which said cooling carriage is provided with guiding means for movement along the wall of said existing conduit in such a way that said cooling carriage is spaced essentially radially uniformly from said wall of said existing conduit.

16. A device according to claim 13, in which said cooling carriage is further provided, behind said shield, with at least one temperature sensor, which slides along said wall of said existing conduit an which measures temperature of the wall that is influenced by cooling carriage speed and quantity of liquefied gas that is to be supplied; and which includes a control device for control of at least one of the cooling carriage speed and the quantity of liquefied gas that is to be supplied, with said at least one temperature sensor being connected to said control device via a control line, said control device effecting change of at least one of cooling carriage speed and quantity of liquefied gas that is to be supplied corresponding to deviation of the measured temperature of the wall from desired conduit wall temperature.

17. A device for preparing an existing underground conduit for replacement by a new conduit, comprising:
- a cooling carriage that is adapted for movement through said existing conduit, with said cooling carriage being connected via a supply line to a tank for receiving therefrom liquefied gas that has a boiling point that is as low as possible at atmospheric pressure;
- spray nozzles provided on said cooling carriage in a substantially radial arrangement for spraying said liquefied gas onto the wall of said existing conduit, from within, over the entire inner periphery of said existing conduit; and
- a mole device for movement through said existing conduit, after said cooling carriage, for fracturing said existing conduit from within with compressive and impact forces, and for widening the space occupied; by said existing conduit to allow for insertion of said new conduit, which is connected behind said mole device;
- said cooling carriage being provided with a shield that is disposed behind said spray nozzles when viewed in the direction of travel of said cooling carriage through said existing conduit, with said shield sliding along said wall of said existing conduit, and resting thereagainst in a sealing manner; in which said cooling carriage is further provided, behind said shield, with at least one temperature sensor, which slides along said wall of said existing conduit and which measures temperature of the wall that is influenced by cooling carriage speed and quantity of liquefied gas that is to be supplied; and which includes a control device for control of at least one of the cooling carriage speed and the quantity of liquefied gas that is to be supplied, with said at least one temperature sensor being connected to said control device via a control line, said control device effecting change of at least one of cooling carriage speed and quantity of liquefied gas that is to be supplied corresponding to deviation of the measured temperature of the wall from desired conduit wall temperature.

18. A device according to claim 17, in which said liquefied gas is liquid nitrogen.

19. A device according to claim 17, in which said cooling carriage is provided with quiding means for movement along the wall of said existing conduit in such a way that said cooling carriage is spaced essentially radially uniformly from said wall of said existing conduit.

* * * * *